(12) United States Patent
Nishioka

(10) Patent No.: US 9,432,938 B2
(45) Date of Patent: Aug. 30, 2016

(54) NETWORK CONTROL METHOD, PATH CONTROL APPARATUS, NETWORK CONTROL SYSTEM AND PATH CONTROL PROGRAM

(75) Inventor: Jun Nishioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 19 days.

(21) Appl. No.: 14/117,392

(22) PCT Filed: Apr. 18, 2012

(86) PCT No.: PCT/JP2012/002680
§ 371 (c)(1),
(2), (4) Date: Nov. 13, 2013

(87) PCT Pub. No.: WO2012/157187
PCT Pub. Date: Nov. 22, 2012

(65) Prior Publication Data
US 2015/0063183 A1   Mar. 5, 2015

(30) Foreign Application Priority Data
May 13, 2011   (JP) .................................. 2011-108090

(51) Int. Cl.
*H04W 52/02* (2009.01)
*H04W 40/10* (2009.01)

(52) U.S. Cl.
CPC ......... *H04W 52/0219* (2013.01); *H04W 40/10* (2013.01); *H04W 52/0258* (2013.01); *H04W 52/0261* (2013.01)

(58) Field of Classification Search
None
See application file for complete search history.

(56) References Cited

U.S. PATENT DOCUMENTS

| 6,295,002 B1* | 9/2001 | Fukuda ................ G08B 29/181 340/531 |
| 2003/0120370 A1* | 6/2003 | Kitayama et al. ............ 700/100 |

FOREIGN PATENT DOCUMENTS

| JP | 2003-102061 A | 4/2003 | |
| JP | 2007-184354 A | 7/2007 | |
| JP | 2008-167047 A | 7/2008 | |
| JP | 2009-81790 A | 4/2009 | |
| JP | 2009081790 | * 4/2009 | ............ H04W 52/02 |
| JP | 2010-28614 A | 2/2010 | |

(Continued)

OTHER PUBLICATIONS
International Search Report for PCT Application No. PCT/JP2012/002680, mailed on May 29, 2012.
(Continued)

*Primary Examiner* — Ian N Moore
*Assistant Examiner* — Lakeram Jangbahadur

(57) ABSTRACT

A total electric energy calculating means 81 calculates total electric energy which can be used by each communication apparatus in a predetermined period. Based on a distribution function which is a function which defines a rate of power which can be used in an arbitrary time zone in the period, and the total electric energy, a usable power calculating means 82 calculates electric energy which can be used by each communication apparatus in a specified time zone. When specifying a time zone in which traffic is accommodated and making a path setting request, a usable electric energy determining means 83 determines per communication apparatus on a communication path whether or not power consumption which is necessary electric energy to accommodate the traffic in the time zone exceeds the electric energy which can be used.

19 Claims, 6 Drawing Sheets

(56) References Cited

FOREIGN PATENT DOCUMENTS

| JP | 2010-252225 A | 11/2010 | |
| JP | 2010252225 | * 11/2010 | ............ H04W 52/18 |

OTHER PUBLICATIONS

C. Perkins et al "Ad hoc On-Demand Distance Vector (AODV) Routing", IETF RFC 3561, Jul. 2003.

* cited by examiner

FIG. 5
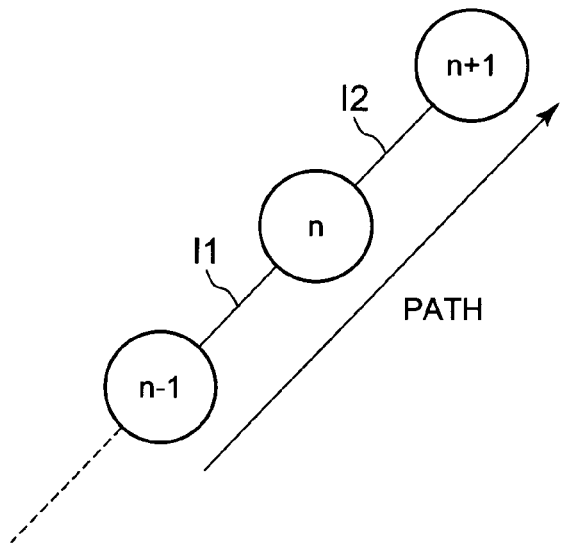
FIG. 6
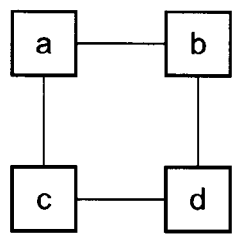
FIG. 7
| LINK | MODULATION SCHEME | BAND | USE BAND |
|------|-------------------|---------|----------|
| 292  | QPSK              | 40Mbps  | 40Mbps   |
| 293  | QPSK              | 40Mbps  | 30Mbps   |
| 294  | QPSK              | 40Mbps  | 30Mbps   |
| 295  | QPSK              | 40Mbps  | 20Mbps   |
| 296  | QPSK              | 40Mbps  | 20Mbps   |

FIG. 8
| COMMUNICATION APPARATUS | $E^{sun}$ | $B(Ns)$ | $B^{MAX}$ |
|---|---|---|---|
| 202 | 960Wh | 1.5kWh | 3kWh |
| 203 | 2kWh | 3kWh | 4kWh |
| 204 | 1.2kWh | 1kWh | 4kWh |
| 205 | 900Wh | 2kWh | 3kWh |
FIG. 9
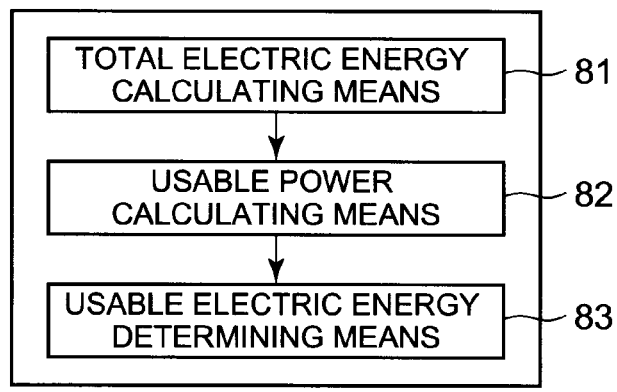
FIG. 10
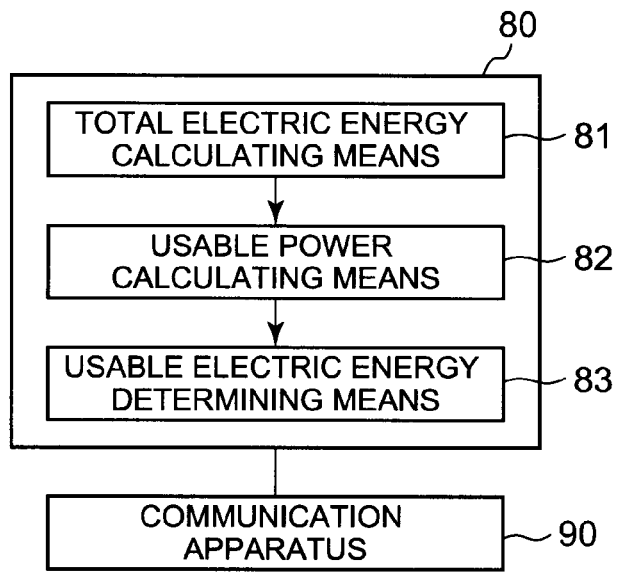

NETWORK CONTROL METHOD, PATH CONTROL APPARATUS, NETWORK CONTROL SYSTEM AND PATH CONTROL PROGRAM

This application is a National Stage Entry of PCT/JP2012/002680 filed on Apr. 18, 2012, which claims priority from Japanese Patent Application 2011-108090 filed on May 13, 2011, the contents of all of which are incorporated herein by reference, in their entirety.

TECHNICAL FIELD

The present invention relates to a network control method, a path control apparatus, a network control system and a path control program which set a communication path of a flow and control a network.

BACKGROUND ART

Accompanying progress of informatization in recent years, demands for a communication infrastructure using mobile telephones are increasing. Demands for mobile telephones are increasing all over the world, and mobile telephone networks are expected even in areas in which an electricity infrastructure is not prepared and electricity is not supplied. In such environment, it is difficult to construct a communication infrastructure using a wired network, and it is necessary to construct a network using wireless communication. Further, a power network is not prepared, and therefore each communication apparatus which configures a communication network cannot depend on power from an outside. Hence, each communication apparatus needs to obtain necessary power by way of in-house power generation such as solar power generation.

Solar power generation is a method of generating power literally using solar light. Hence, the power generation amount depends on the weather or a time zone of a day. To maintain a communication network at all times, it is necessary to store power in a battery in advance and use this power when the power generation amount decreases.

Patent Literature 1 discloses a wireless mesh router a power supply unit of which is formed with a solar battery and a secondary battery. The wireless mesh router disclosed in Patent Literature 1 controls the power supply unit or controls routing based on, for example, a use state of the secondary battery or the solar battery.

Further, Patent Literature 2 discloses a radio link allocating method of allocating a radio link taking into account a frequency band and power. According to the method disclosed in Patent Literature 2, the radio link is optimally allocated per category based on, for example, information of a traffic volume and electric energy which can be used.

In addition, Patent Literature 3 discloses a solar power generation system which predicts a distribution of the cloud at a point of time in the future and predicts generated power of a solar panel based on this prediction. Further, Patent Literature 4 discloses a control apparatus which calculates remaining electric energy of a main power battery according to weather information. Furthermore, Non-Patent Literature 1 discloses AODV (Ad hoc On-Demand Distance Vector) routing of searching a path on-demand.

CITATION LIST

Patent Literature

PLT 1: Japanese Patent Application Laid-Open No. 2010-252225

PLT 2: Japanese Patent Application Laid-Open No. 2003-102061

PLT 3: Japanese Patent Application Laid-Open No. 2007-184354

PLT 4: Japanese Patent Application Laid-Open No. 2008-167047

Non Patent Literature

NPL 1: C. Perkins et al "Ad hoc On-Demand Distance Vector (AODV) Routing", IETF RFC 3561, July, 2003

SUMMARY OF INVENTION

Technical Problem

In a communication apparatus which obtains necessary power by way of in-house power generation such as solar power generation, sizes of solar panels attached to each communication apparatus and battery capacity are restricted because of cost. Hence, when power is used as much as possible without restricting use of power, there is a problem that power becomes insufficient and traffic cannot be accommodated.

In order to, for example, accommodate a great traffic amount, almost all power including power stored in a battery is used during a sunny day. If it rains next day, the power generation amount of solar power generation decreases. In such a case, little power remains in the battery and the power generation amount is insufficient, and therefore there is a problem that traffic cannot be accommodated.

Further, solar power generation has difficulty in generating power even at night likewise. Therefore, it is necessary to restrict use of power during a day time by predicting power to be used during night in advance in order to accommodate traffic even at night.

The wireless mesh router disclosed in Patent Literature 1 controls a radio output according to a remaining solar battery and secondary battery. However, when, for example, a remaining battery rapidly decreases due to concentration of communication, a path which is routed through this router cannot be used for a while. Hence, the wireless mesh router disclosed in Patent Literature 1 has a problem that a path cannot be set taking into account an operating rate of a network and a stable traffic accommodation rate.

Further, according to a radio link allocating method disclosed in Patent Literature 2, radio links are allocated such that an accommodation rate is maximized. However, Patent Literature 2 does not mention a method of constantly maintaining an admission rate (accommodation rate) with respect to a traffic demand. A communication apparatus which requires in-house power generation is required to secure power which is necessary to accommodate traffic, and continues stably accommodating traffic.

It is therefore an exemplary object of the present invention to provide a network control method, a path control apparatus, a network control system and a path control program which, even when there is a communication apparatus, electric energy which can be used of the communication apparatus fluctuates on a communication network, can continue stably accommodating traffic.

Solution to Problem

A network control method according to an exemplary aspect of the present invention includes: calculating total electric energy which can be used by each communication apparatus in a predetermined period; based on a distribution function which is a function which defines a rate of power which can be used in an arbitrary time zone in the period, and the total electric energy, calculating electric energy which can be used by each communication apparatus in a specified time zone; and when specifying a time zone in which traffic is accommodated and making a path setting request, determining per communication apparatus on a communication path whether or not power consumption which is necessary electric energy to accommodate the traffic in the time zone exceeds the electric energy which can be used.

A path control apparatus according to an exemplary aspect of the present invention has: a total electric energy calculating means which calculates total electric energy which can be used by each communication apparatus in a predetermined period; a usable power calculating means which, based on a distribution function which is a function which defines a rate of power which can be used in an arbitrary time zone in the period, and the total electric energy, calculates electric energy which can be used by each communication apparatus in a specified time zone; and a usable electric energy determining means which, when specifying a time zone in which traffic is accommodated and making a path setting request, determines per communication apparatus on a communication path whether or not power consumption which is necessary electric energy to accommodate the traffic in the time zone exceeds the electric energy which can be used.

A network control system according to an exemplary aspect of the present invention has: a communication apparatus; and at least one or more path control apparatuses which control a communication path of the communication apparatus, and the path control apparatus has: a total electric energy calculating means which calculates total electric energy which can be used by each communication apparatus in a predetermined period; a usable power calculating means which, based on a distribution function which is a function which defines a rate of power which can be used in an arbitrary time zone in the period, and the total electric energy, calculates electric energy which can be used by each communication apparatus in a specified time zone; and a usable electric energy determining means which, when specifying a time zone in which traffic is accommodated and making a path setting request, determines per communication apparatus on a communication path whether or not power consumption which is necessary electric energy to accommodate the traffic in the time zone exceeds the electric energy which can be used.

A path control program according to an exemplary aspect of the present invention causes a computer to execute: total electric energy calculation processing of calculating total electric energy which can be used by each communication apparatus in a predetermined period; usable power calculation processing of, based on a distribution function which is a function which defines a rate of power which can be used in an arbitrary time zone in the period, and the total electric energy, calculating electric energy which can be used by each communication apparatus in a specified time zone; and usable electric energy determination processing of, when specifying a time zone in which traffic is accommodated and making a path setting request, determines per communication apparatus on a communication path whether or not power consumption which is necessary electric energy to accommodate the traffic in the time zone exceeds the electric energy which can be used.

Advantageous Effects of Invention

According to the present invention, it is possible to, even when there is a communication apparatus, electric energy which can be used of the communication apparatus fluctuates on a communication network, continue stably accommodating traffic.

BRIEF DESCRIPTION OF DRAWINGS

FIG. 5 It depicts an explanatory view illustrating an example of links between a communication apparatus and a communication apparatus.

FIG. 6 It depicts an explanatory view illustrating an example of a topology of communication apparatuses.

FIG. 7 It depicts an explanatory view illustrating an example of a relationship between a band and a use band of each radio link in the network illustrated in FIG. 1.

FIG. 8 It depicts an explanatory view illustrating an example of a specification of each communication apparatus in the network illustrated in FIG. 1.

FIG. 9 It depicts a block diagram illustrating an example of a minimum configuration of a path control apparatus according to the present invention.

FIG. 10 It depicts a block diagram illustrating an example of a minimum configuration of a network control system according to the present invention.

DESCRIPTION OF EMBODIMENTS

Figure 1:
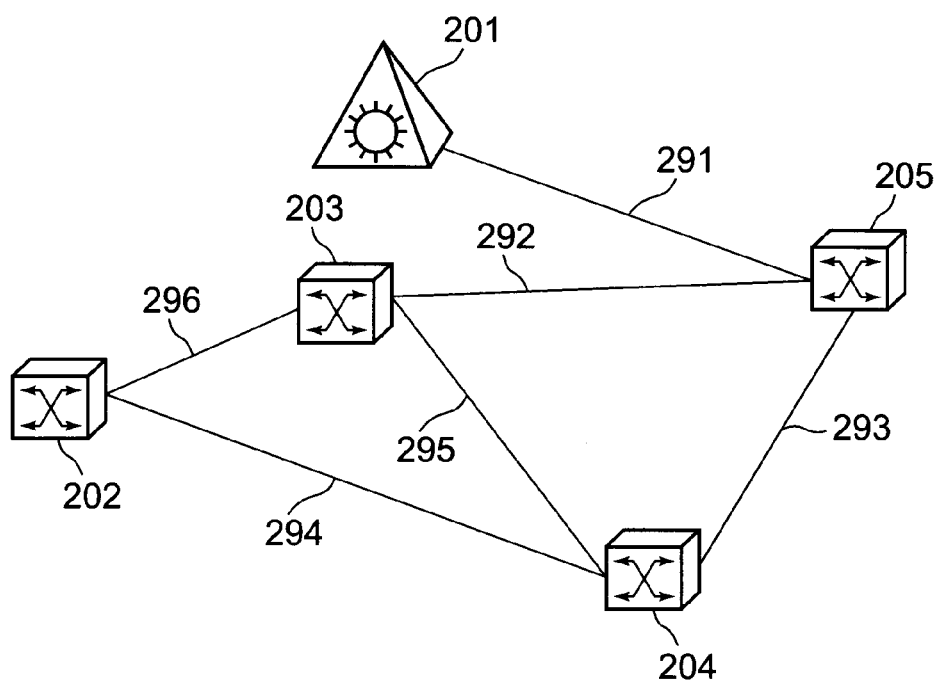
FIG. 1 It depicts an explanatory diagram illustrating an example of a network to which a network control system according to the present invention is applied.

Hereinafter, exemplary embodiments of the present invention will be described with reference to the drawings. FIG. 1 depicts an explanatory diagram illustrating an example of a network to which a network control system according to the present invention is applied. The network control system according to the present invention has a path control apparatus 201 and communication apparatuses 202 to 205. In addition, although FIG. 1 illustrates that the network control system has four communication apparatuses, the number of communication apparatuses is not limited to four. The number of communication apparatuses may be two to three or may be five or more.

The communication apparatuses 202 to 205 are apparatuses which have independent power sources and batteries and electric energy which can be used of the apparatuses fluctuates. The power sources of the communication apparatuses 202 to 205 mainly depend on solar power generation and power stored in the batteries. Further, the communication apparatuses 202 to 205 are connected to radio links which have adaptive modulating functions.

The path control apparatus 201 and the communication apparatus 205 are connected through a fixed line 291. Further, the communication apparatus 205 is connected to the communication apparatus 203 through a radio link 292, and is connected to the communication apparatus 204 through a radio link 293. Furthermore, the communication apparatus 204 is connected to the communication apparatus 203 through a radio link 295 and is connected to the communication apparatus 202 through a radio link 294. Still further, the communication apparatus 203 is connected to the communication apparatus 202 through a radio link 296. That is, it can be said that the communication apparatuses 202 to 205 are connected to a radio mesh network.

As described above, a case will be described below where the network control system according to the present invention is applied to a mobile backhaul network.

The path control apparatus 201 manages the entire communication network. For example, processing of accepting and finishing a new flow is performed by the path control apparatus 201. Further, the path control apparatus 201 acquires link quality of a radio link such as a modulation scheme of use, and information such as battery capacity, from the communication apparatuses 202 to 205.

Figure 2:
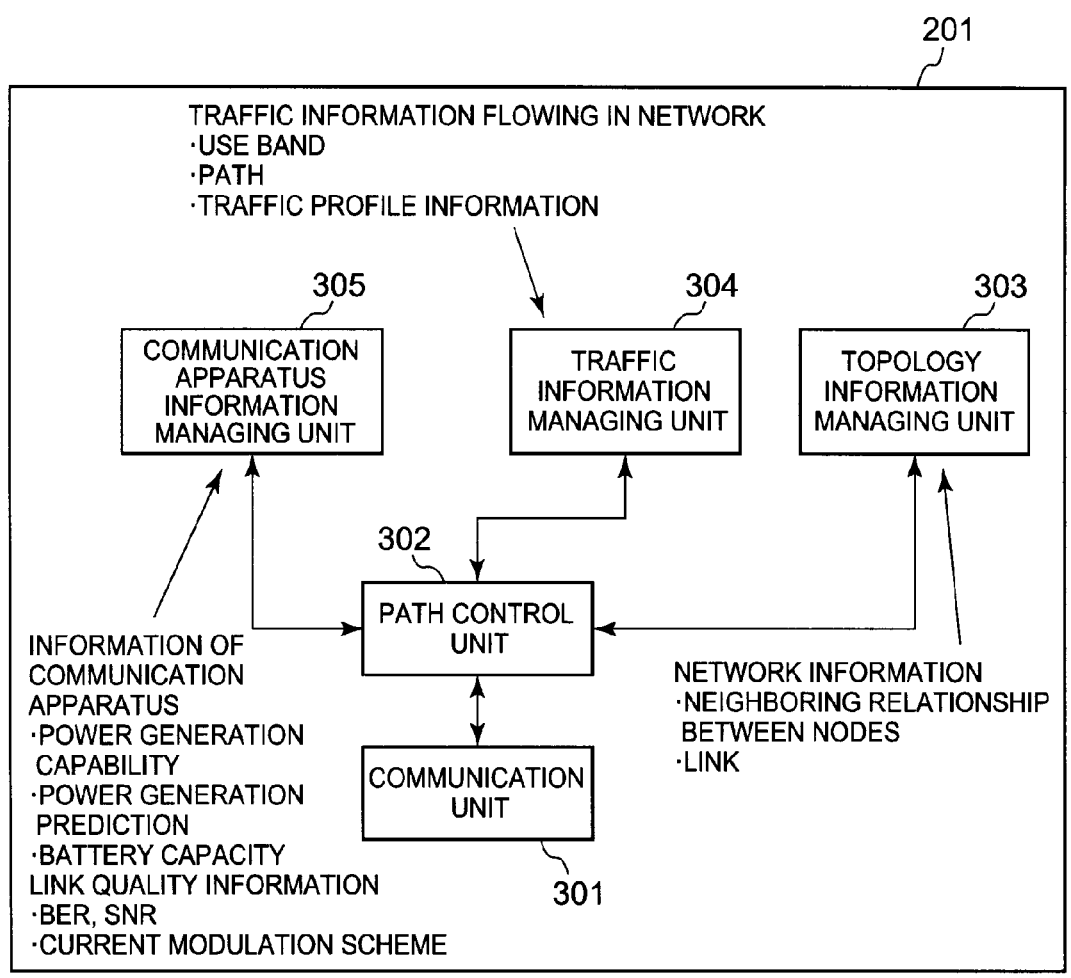
FIG. 2 It depicts a block diagram illustrating a configuration example of an exemplary embodiment of a path control apparatus.

FIG. 2 depicts a block diagram illustrating a configuration example of an exemplary embodiment of the path control apparatus. The path control apparatus 201 according to the present exemplary embodiment has a communication unit 301, a path control unit 302, a topology information managing unit 303, a traffic information managing unit 304 and a communication apparatus information managing unit 305.

The communication unit 301 performs communication with the communication apparatus 205 through the fixed line 291.

The topology information managing unit 303 stores topology information of the network to which the path control apparatus 201 and the communication apparatuses 202 to 205 are connected. The topology information includes, for example, a neighboring relationship between nodes and network information indicating links.

The traffic information managing unit 304 stores information of a flow flowing in the network. Further, the traffic information managing unit 304 also stores traffic profile information including statistical information of the entire traffic flowing in the network. Furthermore, the traffic information managing unit 304 may store traffic information which represents a use band and a path of the flow.

The communication apparatus information managing unit 305 stores information of each of the communication apparatuses 202 to 205. More specifically, the communication apparatus information managing unit 305 stores communication apparatus information which represents capacity of the battery which each of the communication apparatuses 202 to 205 has and a predicted power generation amount, and information of the link which each of the communication apparatuses 202 to 205 manages (referred to as "link information" below). The link information includes, for example, an empty band of a link and a list of flows which use links. The communication apparatus information managing unit 305 may additionally store power generation capability of the communication apparatuses, link quality information, a BER (Bit error rate), a SNR (Signal to Noise ratio) and a current modulation scheme.

The topology information managing unit 303, the traffic information managing unit 304 and the communication apparatus information managing unit 305 are realized by, for example, a magnetic disk.

When receiving a request or an end notice of a new flow transmitted to the path control apparatus 201, the path control unit 302 extracts necessary information from the topology information managing unit 303, the traffic information managing unit 304 and the communication apparatus information managing unit 305, and sets a path and allocates a band. In addition, an operation of the path control unit 302 will be described below.

In addition, the path control unit 302 is realized by a CPU of a computer which operates according to a program (network control program). For example, the program is stored in a memory unit (not illustrated) of the path control apparatus 201, and the CPU may read this program and operate as the path control unit 302 according to the program.

Figure 3:
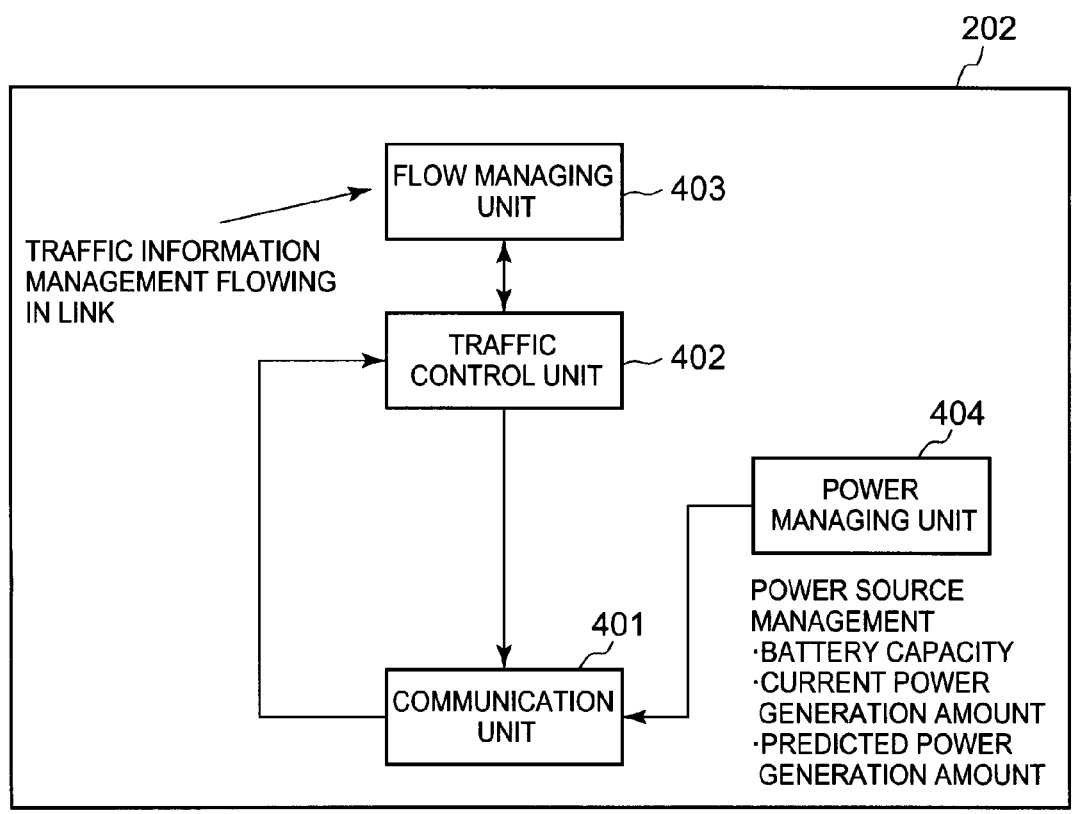
FIG. 3 It depicts a block diagram illustrating a configuration example of an exemplary embodiment of a communication apparatus.

FIG. 3 depicts a block diagram illustrating a configuration example of an exemplary embodiment of a communication apparatus. Each of the communication apparatuses 202 to 205 according to the present exemplary embodiment has a communication unit 401, a traffic control unit 402, a flow managing unit 403 and a power source managing unit 404.

The communication unit 401 performs communication with the other communication apparatuses and the path control apparatus 201 through a fixed line or radio links. Further, the communication unit 401 changes a modulation scheme used by a radio link according to a command of the traffic control unit 402 described below.

The flow managing unit 403 stores information related to a flow such as an allocated band or a transfer destination of a flow which uses a link (referred to as "resource allocation information" below). More specifically, the flow managing unit 403 stores the resource allocation information received from the path control apparatus 201. Further, the flow managing unit 403 may store traffic information flowing in the link.

The power source managing unit 404 has a solar panel and a battery (not illustrated). The power source managing unit 404 manages information related to power of a communication apparatus such as a battery capacity, a predicted power generation amount and current use power (referred to as "communication apparatus power information" below). More specifically, the power source managing unit 404 measures the power generation amount of a solar panel and the current battery capacity, and stores the measurement result. Further, the power source managing unit 404 notifies these pieces of communication apparatus power information to the path control apparatus 201. The power source managing unit 404 may notify the communication apparatus power information to the path control apparatus 201 at a predetermined timing, and notify communication apparatus power information to the path control apparatus 201 according to an inquiry from the path control apparatus 201.

The traffic control unit 402 controls a band of a flow which uses a link, and controls a path. When receiving information indicating a band allocated to each flow and a transfer destination of each flow (that is, resource allocation information) from the path control apparatus 201, the traffic control unit 402 stores the received information in the flow managing unit 403. Further, the traffic control unit 402 controls traffic based on information (resource allocation information) stored in the flow managing unit 403.

Furthermore, the traffic control unit 402 commands the communication unit 401 to change a modulation scheme used in a radio link based on the resource allocation information managed by the flow managing unit 403.

Figure 4:
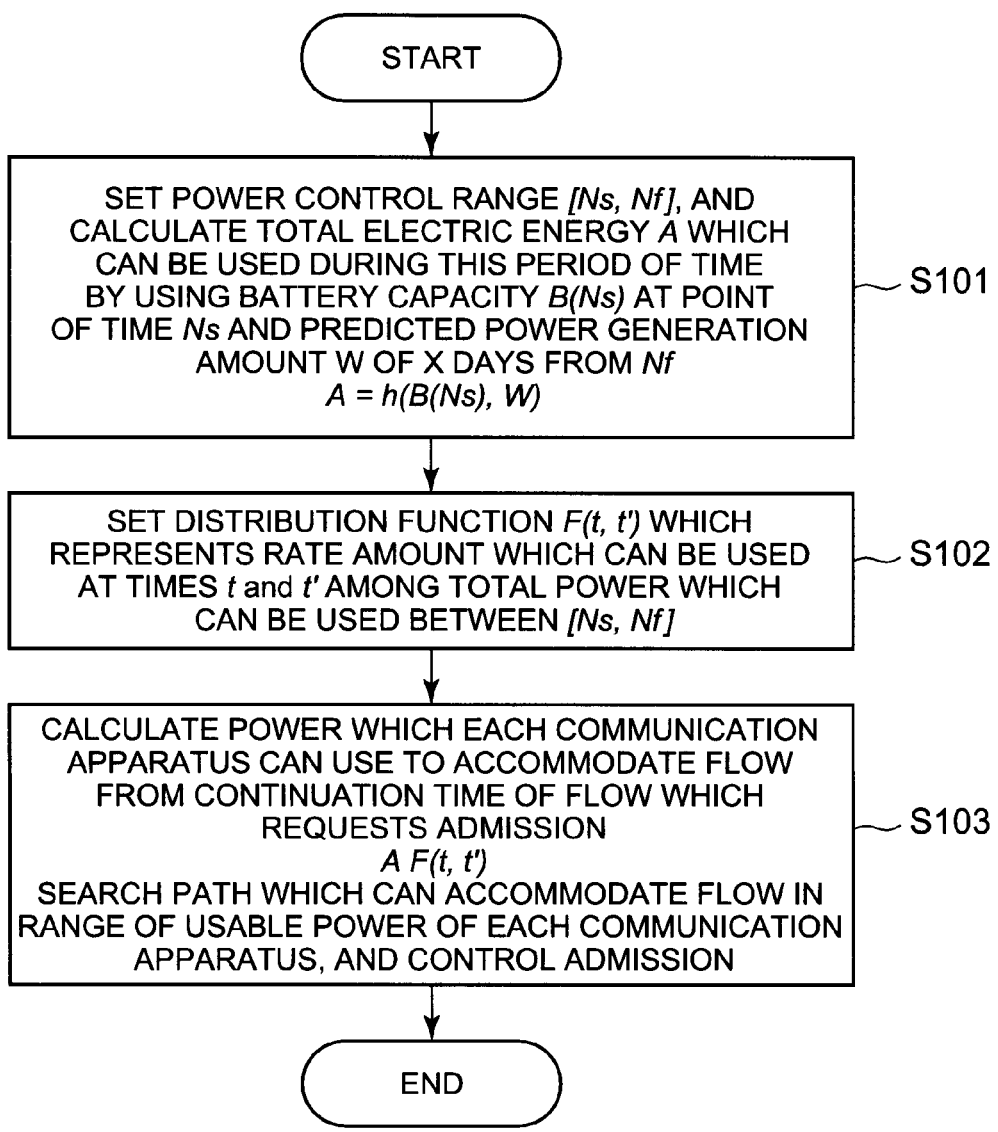
FIG. 4 It depicts a flowchart illustrating an operation example of a path control unit 302.

Next, an outline of an operation of the path control unit 302 will be described. FIG. 4 depicts a flowchart illustrating an operation example of the path control unit 302.

In the following description, since a power generation cycle of solar power generation is in daily units, electric energy which can be used by each communication apparatus is restricted in daily units. That is, in the following description, the path control unit 302 calculates total electric energy which can be used by each communication apparatus in one day. When a period to calculate the total electric energy is [Ns, Nf], for example, a period of one day is Ns=0 hour 0 minute 0 second and Nf=23 hour 59 minute 59 second. In addition, in the following description, a period [Ns, Nf] is referred to as a "control section".

First, the path control unit 302 calculates the total electric energy which can be used by each communication apparatus during the period [Ns, Nf]. Total electric energy A is calculated according to following equation 1 based on battery capacity B (Ns) at a point of time Ns and a predicted power generation amount W based on weather prediction in a predetermined period (for example, two days or three days) from Nf (step S101).

$$A=h(B(Ns),W) \quad \text{(Equation 1)}$$

Meanwhile, h(*) is an arbitrary function of calculating a value of A based on values of B(Ns) and W. Based on this function, the path control unit 302 restricts the total electric energy which can be used to a fixed amount. Further, the battery capacity B(Ns) can also be referred to as remaining battery.

Next, the path control unit 302 calculates electric energy which can be used by each communication apparatus in a specified time zone during the period [Ns, Nf]. First, the path control unit 302 sets a distribution function $F(t, t')|t'\geq t$ which defines a rate of electric energy which can be used among the total electric energy A which can be used during the period [Ns, Nf], in an arbitrary time zone "from a time t to t'" in the period (step S102). The distribution function F(t, t') is defined according to following equation 2.

$$F(t,t')=G(t')-G(t) \quad \text{(Equation 2)}$$

Meanwhile, G(t) is an arbitrary monotonically non-decreasing function satisfying G(Nf)=1 and G(Ns)≥0. That is, G(t) can be referred to as a function (referred to as a "cumulative usable power function" below) which represents a cumulative rate of electric energy which can be used in the period from the time Ns to Nf. In addition, step S101 and step S102 are executed per period [Ns, Nf] at a predetermined span on a regular basis.

Next, when receiving an admission request of a flow an end time of which is t' from another apparatus at the time t during the period [Ns, Nf] (that is, specifying a time zone in which traffic is accommodated and making a path setting request), the path control unit 302 of the path control apparatus 201 calculates power which can be used by each communication apparatus while the flow is generated (that is, from the time t to t') using the total electric energy A calculated in step S101 and step S102 and the distribution function F(t, t'). The electric energy which can be used by each communication apparatus from the time t to t' is calculated according to following equation 3.

$$A*F(t,t') \quad \text{(Equation 3)}$$

Further, the path control unit 302 searches a path such that power consumption of each communication apparatus does not exceed usable power (step S103). More specifically, the path control unit 302 determines per communication apparatus on the communication path whether or not electric energy which is necessary to accommodate traffic exceeds the electric energy which can be used in a time zone in which an admission request is made. Further, the path control unit 302 searches a path which is routed through the communication apparatus power consumption of which does not exceed the electric energy which can be used. The path control unit 302 searches a path such that power consumption of each communication apparatus settles in the range of the electric energy which can be used, from, for example, a request band or a continuation time of the flow. In addition, when the path is not found, a flow request (admission request) from another apparatus is rejected. According to the above process, the path control apparatus controls use electric energy of each communication apparatus.

Next, an operation of the path control apparatus 201 according to the present exemplary embodiment will be described in detail. First, processing in step 101 will be described. The path control unit 302 of the path control apparatus 201 determines a control section [Ns, Nf], and calculates the total electric energy A which each communication apparatus can use in the control section [Ns, Nf] (step S101). In the present exemplary embodiment, a range of the control section is one day.

More specifically, in step S101, the path control unit 302 first acquires power generation capability and battery capacity of each communication apparatus from the communication apparatus information managing unit 305. When the information indicating the power generation capability and the battery capacity of each communication apparatus is old, the path control unit 302 may directly inquire these pieces of information to each communication apparatus.

Next, the path control unit 302 calculates power which can be used in a fixed period [Ns, Nf] from the future predicted power generation amount based on a rate of current battery capacity and weather prediction. A total electric energy $A_n$ which each communication apparatus can use in the period [Ns, Nf] can be calculated according to following equation 4.

$$A_n=h(B_n(Ns),W_n) \quad \text{(Equation 4)}$$

Meanwhile, $B_n$(Ns) represents battery capacity (remaining battery) of a communication apparatus n at a point of time Ns. $W_n$ represents a predicted power generation amount of the communication apparatus n based on weather prediction of x days from Nf. Further, h(*) represents an arbitrary function of calculating a value of $A_n$ based on values of $B_n$(Ns) and $W_n$.

In addition, weather prediction used to calculate the predicted power generation amount may be information received from another external system (weather prediction system), or may be information derived by the path control apparatus 201.

The path control unit 302 may determine, for example, a period (the number of days) in which precision of weather prediction satisfies predetermined reference value as a period x for calculating the predicted power generation amount of the communication apparatus n. The path control unit 302 determines, for example, the period in which precision of weather prediction exceeds a predetermined reference value as the period X for calculating the predicted power generation amount based on past statistical information. When, for example, a precision reference value is 70%, precision of weather prediction three days ahead is 70% or more and weather prediction four days ahead is 60%, the path control unit 302 determines the period x as three days.

Further, the path control unit 302 calculates, for example, the predicted power generation amount of x days based on an average power generation amount of one day per weather. The power generation amount of solar power generation basically depends on the weather significantly and, when, for example, the average power generation amount of one day per weather is 600 Wh on a sunny day, is 300 Wh on a cloudy day and is 100 Wh on a rainy day. Next, the path control unit 302 calculates the predicted power generation amount $W_n$ based on weather prediction of the x days of the period. For example, the period x to calculate the predicted power generation amount is three days, weather prediction of the three days is "sunny, sunny and cloudy". In this case, the path control unit 302 calculates $W_n$=600+600+ 300=1500 Wh.

For example, the predicted power generation amount in the period [Ns, Nf] is $E^{exp}$, battery capacity at a point of time Ns is $B_n(Ns)$, and a lower limit of the battery capacity is $B_{lim}$. Meanwhile, when $B_n(Ns)+E^{exp}-A_n<B_{lim}$ holds, the total electric energy $A_n$ is set as in following equation 5.

$$A_n=B_n(Ns)+E^{exp}-B_{lim} \qquad \text{(Equation 5)}$$

Next, processing in step S102 will be described. The path control unit 302 determines the distribution function F(t, t') which defines distribution of electric energy which can be used in the time [t, t'] in the control section [Ns, Nf] (step S102). Meanwhile, above equation 2 is used. In addition, as described above, processing in step S101 and step S102 is performed on a regular basis at a cycle of the control section [Ns, Nf].

More specifically, in step S102, the path control unit 302 determines a distribution function F(t, t')|t'≥t which defines distribution of electric energy which can be used in the time [t, t'] during the period [Ns, Nf]. Meanwhile, the distribution function is defined as above equation 2, and a distribution function G(t) which complies with a traffic profile is used for G(t).

The path control unit 302 acquires traffic profile information tr(t) during the period [Ns, Nf] from the traffic information managing unit 304. In this case, the path control unit 302 sets G(t) as in following equation 6.

$$G(t)=\int_{Ns}^{t}tr(t)/\int_{Ns}^{Nf}tr(t) \qquad \text{(Equation 6)}$$

Meanwhile, tr(t) represents a traffic volume at the time t. That is, in above equation 6, a numerator is a definite integral of tr(t) from Ns to t, and a denominator is a definite integral of tr(t) from Ns to Nf. In this case, the distribution function F(t, t') can be defined as in following equation 7.

$$\begin{aligned}F(t,t') &= G(t') - G(t) \\ &= \int_{Ns}^{t'}tr(t)/\int_{Ns}^{Nf}tr(t) - \int_{Ns}^{t}tr(t)/\int_{Ns}^{Nf}tr(t) \\ &= \int_{t}^{t'}tr(t)/\int_{Ns}^{Nf}tr(t)\end{aligned} \qquad \text{(Equation 7)}$$

That is, the path control unit 302 defines the distribution function F(t, t') based on the traffic profile. More specifically, the path control unit 302 calculates a rate of the traffic volume of the period [t, t'] with respect to the traffic volume of the period [Ns, Nf], and defines this rate as the distribution function F(t, t').

Next, processing in step S103 will be described. When receiving an admission request of the flow during the control section [Ns, Nf], the path control unit 302 of the path control apparatus 201 calculates power which each communication apparatus can use to accommodate the flow, based on the results in step S101 and step S102 (that is, the total electric energy A and the distribution function F(t, t')). Further, the path control unit 302 searches a path which can accommodate traffic in the range of the usable power (step S103).

More specifically, in step S103, when receiving at the time t during the period [Ns, Nf] an admission request of a flow the end time of which is t', the path control unit 302 first calculates electric energy which each communication apparatus can use during accommodation of the flow using the total electric energy A and the distribution function F(t, t') calculated in step S101 and step S102. Further, the path control unit 302 searches a path in which power consumption of each communication apparatus is accommodated in electric energy which can be used when the flow is accommodated.

When power consumption of the communication apparatus is usable power or more, the path control unit 302 removes this communication apparatus from candidates. Further, when a path is found, the path control unit 302 notifies this information to each communication apparatus, and accepts the flow. The path control unit 302 may transmit information which indicates a path which accepts a flow, to a communication apparatus on the path, and transmit information which indicates the path which accepts the flow, to all communication apparatuses managed by the path control apparatus 201.

Processing of determining whether or not power consumption of a communication apparatus exceeds usable power will be described. FIG. 5 depicts an explanatory view illustrating an example of links between a communication apparatus and a communication apparatus. In an example illustrated in FIG. 5, there are three communication apparatuses (communication apparatuses n−1, n, and n+1), and the communication apparatus n−1 and the communication apparatus n are connected through a link 11 and the communication apparatus n and the communication apparatus n+1 are connected through a link 12. Further, in the example illustrated in FIG. 5, the flow flows from the communication apparatus n−1 to the communication apparatus n+1 through the communication apparatus n.

As illustrated in FIG. 5, when the flow is unilateral, the path control unit 302 checks whether or not an inequality of equation 8 described below holds upon search of the path routed through the link 12 from the communication apparatus n.

$$P_n+D_{12}<=A_n*F(t,t')$$

$$P_{n+1}+D_{12}<=A_{n+1}*F(t,t') \qquad \text{(Equation 8)}$$

Meanwhile, $P_n$ is current power consumption of the communication apparatus n, and $D_{12}$ is increased power consumption when a flow is added to the link 12.

Meanwhile, when the flow is bi-directional, the flow also flows from the communication apparatus n+1 to the communication apparatus n−1 through the communication apparatus n (that is, even in a reverse direction) in the example illustrated in FIG. 5. Hence, to calculate power consumption of each communication apparatus during search of a path, it is necessary to take into account not only power consumption of a unilateral link of the path but also a change of power consumption in a link to an immediately prior communication apparatus. Hence, the path control unit 302 needs to check whether or not the inequality of equation 9 described below holds in the communication apparatus n existing in the middle of the path. In addition, $D_{11}$ is increased power consumption when the flow is added to the link 11.

$$P_n+D_{11}+D_{12}<=A_n*F(t,t')$$

$$P_{n+1}+D_{12}<=A_{n+1}*F(t,t') \qquad \text{(Equation 9)}$$

In addition, the inequalities indicated in above equation 8 and equation 9 assume that the power generation amount is temporally fixed. Meanwhile, an actual power generation amount temporally fluctuates. Hence, even when the inequalities indicated by above equation 8 and equation 9 are satisfied, if the flow is accommodated, battery capacity of each communication apparatus temporarily goes below $B_{lim}$ set in advance during accommodation of the flow. When this is predicted, the path control unit 302 may remove this communication apparatus from candidates.

Next, a method of searching a path will be described. FIG. 6 depicts an explanatory view illustrating an example of a topology of communication apparatuses. a, b, c and d illustrated in FIG. 6 indicate communication apparatuses, respectively. Further, solid lines connecting between communication apparatuses indicate links connecting the communication apparatuses. Hereinafter, a path from a to d is searched.

The path control unit 302 sequentially searches a path from the link connected to each communication apparatus to a destination communication apparatus. In an example illustrated in FIG. 6, the path control unit 302 sequentially searches paths of a-c, a-b, a-b-d and a-c-d. Further, the path control unit 302 compares electric energy which can be used and power consumption of a communication apparatus every time the link is tracked. In the example illustrated in FIG. 6, when the path of a-c is searched, the path control unit 302 calculates power consumption amounts of a and c, and compares the power consumption amount and the electric energy which can be used. Similarly, when the path of a-c-d is searched, the path control unit 302 calculates power consumption amounts of a, c and d in case that the links of a-c and c-d are used, and compares the power consumption amounts and the electric energy which can be used.

When there is a plurality of paths to a destination, the path control unit 302 may select a path the total power consumption of which is little. In the example illustrated in FIG. 6, there are two paths from a to d, namely, a-b-d and a-c-d. When both a-b-d and a-c-d can be used as paths (that is, the power consumption amount goes below the electric energy which can be used), the path control unit 302 may compare the total of link cost used in respective paths, and select the path a total value of which is small. In addition, for the link cost in this case, increased power consumption amount of the link may be used.

As described above, according to the present exemplary embodiment, the path control unit 302 calculates the total electric energy A which can be used during the period [Ns, Nf] in the communication apparatuses 202 to 205. Further, based on the distribution function F which defines the rate of power which can be used in the time zone (t, t') in the period [Ns, Nf], and the total electric energy A, the path control unit 302 calculates electric energy which can be used by each of the communication apparatuses 202 to 205 in the specified time zone. Furthermore, when specifying a time zone in which traffic is accommodated and making a path setting request, the path control unit 302 determines per communication apparatus on a communication path whether or not power consumption in the time zone exceeds the electric energy which can be used. Consequently, it is possible to, even when there is a communication apparatus, electric energy which can be used of the communication apparatus fluctuates on a communication network, continue stably accommodating traffic.

That is, in step S101, the path control unit 302 restricts the electric energy which can be used to a fixed volume based on, for example, a power generation amount upon a sunny day or an average power generation amount. Consequently, it is possible to suppress excessive use of power. Further, the path control unit 302 determines usable power based on power which remains in the battery and power generation prediction. Consequently, when power of the battery decreases or when a future predicted power generation amount is predicted to decrease, it is possible to suppress the usable power. Consequently, it is possible to prepare for a subsequent decrease of the power generation amount.

Further, in step S102, the path control unit 302 determines distribution of the usable power calculated in step S101. Consequently, it is possible to control an accommodation traffic volume per time. Consequently, it is possible to control a traffic volume to suppress a daytime traffic volume and increase a night time traffic volume accordingly.

Further, when searching a path in response to the admission request of the flow, the path control unit 302 searches a path which can accommodate in the range of the usable power calculated by processing in step S101 and step S102. When, for example, a path is not found, the path control unit 302 rejects a flow under admission control. Consequently, it is possible to contain power consumption of each communication apparatus in the range of a power use amount determined in step S101 and step S102.

Although a case has been described with the present exemplary embodiment where the path control apparatus 201 calculates total electric energy and usable power of each communication apparatus, each of the communication apparatuses 202 to 205 may control a path. That is, the traffic control unit 402 of each of the communication apparatuses 202 to 205 may have a function of the path control unit 302 of the path control apparatus 201. In this case, it is possible to distribute a path control processing load to each communication apparatus.

Further, although a case has been described with the present exemplary embodiment as an example where the communication apparatuses 202 to 205 perform solar power generation, a method of generating power in the communication apparatuses 202 to 205 is not limited to solar power generation. The communication apparatuses 202 to 205 may generate power using other natural energy as a power source.

That is, in the present exemplary embodiment, electric energy which can be used in each time is restricted in the radio mesh network in which each communication apparatus operates using power from solar power generation and the battery as energy. Consequently, it is possible to stably accommodate traffic without an influence of fluctuation of a power generation amount due to a time zone or the weather of a day.

Example 1

Although the present invention will be described below based on specific examples, the scope of the present invention is by no means limited to the following content. In the present example, a case will be described as an example where a communication network illustrated in FIG. 1 is controlled.

Further, in the present example, the distribution function F(t, t') is set based on a traffic profile, and a traffic profile (tr(t)=K and K is a constant) a traffic volume of which is fixed irrespectively of the time is given.

A path control unit 302 of a path control apparatus 201 calculates the total electric energy A which each of a communication apparatuses 202 to 205 can use in the period [Ns, Nf] as indicated in following equation 10 using the battery capacity B(Ns) at the point of time Ns and the predicted power generation amount W of three days from Nf.

$$A = h(B(Ns), W) \quad \text{(Equation 10)}$$

$$= E^{sun} * (1 - ((1 - B(Ns)/B^{MAX}) * (1 - W/(3*E_n^s))))$$

Meanwhile, $E^{sun}$ is power generation amount which is expected in the period [Ns, Nf] upon a sunny day, or average power generation amount in the period [Ns, Nf] based on past statistical information. Further, $B^{MAX}$ is maximum battery capacity, and $E^3$ is a power generation amount of one day upon a sunny day. That is, $3*E_n^s$ can be referred to as a "power generation amount" when three days from Ns are all sunny. In addition, $E_n^s$ indicates that power generation amount of each communication apparatus is identified. Further, $E^s$ is not limited to power generation amount of one day upon a sunny day. As $E^s$, an average power generation amount based on statistical information may be used. Thus, as indicated in equation 10, using a power generation amount which is expected upon a sunny day or an average power generation amount based on statistical information (for example, $E^{sun}$) as a reference, the path control unit 302 calculates total electric energy based on the rate of a remaining battery (for example, the battery capacity B(Ns)) with respect to maximum battery capacity (for example, $B^{MAX}$) and a rate of a predicted power generation amount (for example, W) based on weather prediction in a predetermined period with respect to the power generation amount upon a sunny day in the predetermined period (for example, three days).

The function indicated in above equation 10 indicates that, when the battery capacity B(Ns) decreases, a value of the total electric energy A decreases. Further, the function indicated in above equation 10 indicates that, when the battery capacity B(Ns) becomes higher, the total electric energy A becomes closer to $E^{sun}$. Furthermore, the function indicated in above equation 10 indicates that, when the weather is bad from Nf and the power generation amount cannot be expected, the total electric energy A tends to be suppressed. Thus, the total electric energy A is determined based on $E^{sun}$ as a reference, so that it is possible to suppress excessive use of power.

As described above, the communication network in the present example includes the path control apparatus 201 and the communication apparatuses 202 to 205 as illustrated in FIG. 1. The path control apparatus 201 and the communication apparatus 205 are connected through a fixed line 291. Further, the communication apparatus 205 is connected to the communication apparatus 203 through a radio link 292, and is connected to the communication apparatus 204 through a radio link 293. Furthermore, the communication apparatus 204 is connected to the communication apparatus 203 through a radio link 295 and is connected to the communication apparatus 202 through a radio link 294. Still further, the communication apparatus 203 is connected to the communication apparatus 202 through a radio link 296.

Each radio link is a bi-directional link, and a unilateral band changes to 40 Mbps, 80 Mbps and 108 Mbps according to the modulation schemes QPSK, 16 QAM and 32 QAM, respectively. Further, power consumption of a transmission side communication apparatus changes to 10 W, 12 W and 16 W according to the modulation schemes QPSK, 16 QAM and 32 QAM, respectively.

FIG. 7 depicts an explanatory view illustrating an example of a relationship between a band and a use band of each radio link in the network illustrated in FIG. 1. In an example illustrated in FIG. 7, for example, a modulation scheme of the radio link 292 is QPSK, a band is 40 Mbps and a use band is 40 Mbps.

FIG. 8 depicts an explanatory view illustrating an example of a specification of each communication apparatus in the network illustrated in FIG. 1. An example illustrated in FIG. 8 illustrates a relationship between the average power generation amount $E^{sun}$ of each communication apparatus in the period [Ns, Nf] upon a sunny day, the maximum battery capacity $B^{MAX}$ and the battery capacity B(Ns) at a point of time Ns.

Meanwhile, the power generation amount (that is $3*E_n^s$) in case that the predicted power generation amounts in three days from Ns are all sunny is 1, and the rate of the predicted power generation amount W in three days with respect to this power generation amount is δ=0.5. Meanwhile, δ=W/$(3*E_n^s)$ holds. In this case, the power A which each communication apparatus can use in the period [Ns, Nf] is calculated according to following equation 12.

$$A_{202}=960*(1-½*(1-0.5))=720 \text{ Wh}$$

$$A_{203}=2000*(1-¼*(1-0.5))=1750 \text{ Wh}$$

$$A_{204}=1200*(1-¾*(1-0.5))=750 \text{ Wh}$$

$$A_{205}=900*(1-⅓*(1-0.5))=750 \text{ Wh} \quad \text{(Equation 11)}$$

Next, the path control unit 302 sets the distribution function F(t, t') which defines the rate of electric energy which can be used from the time t to t'. In the present example, the path control unit 302 sets the distribution function F(t, t') as in following equation 12 based on the traffic profile (tr(t)=K) the traffic volume of which is fixed. In addition, a time unit is hereinafter an hour.

$$G(t) = \int_{Ns}^{t} tr(t) / \int_{Ns}^{Nf} tr(t) \quad \text{(Equation 12)}$$

$$= (t - Ns)/(Nf - Ns)$$

$$= t/24$$

$$F(t, t') = G(t') - G(t)$$

$$= (t' - t)/24$$

Meanwhile, the path control apparatus 201 accepts an admission request (communication band securing request) of a bi-directional flow which uses 10 Mbps in the period from the time t to t'=t+2 between the communication apparatus 202 and the communication apparatus 205 at the time t. In this case, the path control unit 302 of the path control apparatus 201 calculates power which can be used during a continuation time of the flow of each communication apparatus. In this case, the path control unit 302 calculates F(t, t')=1/12 using equation 11. In this case, power which each communication apparatus can use is calculated according to following equation 13.

$$A_{202}*F(t,t')=720/12=60 \text{ Wh}$$

$$A_{203}*F(t,t')=1750/12 \approx 145 \text{ Wh}$$

$$A_{204}*F(t,t')=750/12 \approx 62 \text{ Wh}$$

$$A_{205}*F(t,t')=750/12 \approx 62 \text{ Wh} \quad \text{(Equation 13)}$$

Next, the path control unit 302 of the path control apparatus 201 searches a path which accommodates a flow. Hereinafter, the path control unit 302 checks whether or not a path "communication apparatus 202-communication apparatus 203-communication apparatus 205" is available as the path from the communication apparatus 202 to the communication apparatus 205. First, the path control unit 302 checks a path from the communication apparatus 202 to the communication apparatus 203.

In the example illustrated in FIG. 1, the path from the communication apparatus 202 to the communication apparatus 203 is routed through the radio link 296. Then, the path control unit 302 checks power consumption of the communication apparatus 202 and the communication apparatus 203 in case that a flow is added to the radio link 296. More specifically, when current power consumption of the communication apparatus 202 is $P_{202}$, power consumption of the communication apparatus 203 is $P_{203}$ and increase in power consumption of the radio link 296 when a flow is added thereto is $D_{296}$, the path control unit 302 checks whether or not an inequality indicated in following equation 14 holds.

$$(P_{202}+D_{296})*(t'-t)<=A_{202}*F(t,t')$$

$$(P_{203}+D_{296})*(t'-t)<=A_{203}*F(t,t') \quad \text{(Equation 14)}$$

Power consumption of the communication apparatus 202 and the communication apparatus 203 is total power consumption of respective links. Hence, $P_{202}=20$ and $P_{203}=30$ are calculated. Further, the radio link 296 has an extra band which can accommodate a flow without changing a modulation scheme. Hence, $D_{296}=0$ is calculated. Consequently, the inequality indicated in equation 14 holds.

$$P_{202}+D_{296}=(20+0)*2<60$$

$$P_{203}+D_{296}=(30+0)*2<145$$

Next, the path control unit 302 checks a path from the communication apparatus 203 to the communication apparatus 205. Similar to the above method, the path control unit 302 checks power consumption of the communication apparatus 203 and the communication apparatus 205 in case that a flow is added to the radio link 292 connecting the communication apparatus 203 and the communication apparatus 205.

Hereinafter, the radio link 296 is used between an immediately prior route "communication apparatus 202-communication apparatus 203". Hence, the total power consumption of the communication apparatus 203 in case that this path is selected is $P_{203}+D_{296}+D_{292}$. The path control unit 302 compares consumption power and usable power of the communication apparatus 203 and the communication apparatus 205. More specifically, when the power consumption of the communication apparatus 205 is $P_{205}$ and an increase of power consumption of the radio link 296 when a flow is added thereto is $D_{296}$, the path control unit 302 checks whether or not an inequality indicated in following equation 15 holds.

$$(P_{203}+D_{296}+D_{292})*(t'-t)<=A_{203}*F(t,t')$$

$$(P_{205}+D_{292})*(t'-t)<=A_{205}*F(t,t') \quad \text{(Equation 15)}$$

In an example illustrated in FIG. 1, the radio link 292 needs to change a modulation scheme from QPSK to 16 QAM to secure a band which accommodates the flow. Hence, power consumption is increased by 2 W. That is, $D_{292}=2$ holds. Consequently, $P_{203}=30$ and $P_{205}=20$ hold, and then the following inequality holds.

$$P_{203}+D_{296}+D_{292}=(30+0+2)*2<145$$

$$P_{205}+D_{292}=(20+2)*2<62$$

Consequently, upon accommodation of the flow, even when the path "communication apparatus 202-communication apparatus 203-communication apparatus 205" is used, use power of each communication apparatus does not exceed allocated power. Then, the path control apparatus 201 accepts an admission request of the flow and sets a path.

In addition, the above path setting can be executed even according to a path control method of calculating a path according to distribution as in AODV disclosed in Non-Patent Literature 1. In this case, upon transfer of Route Request or transfer of Route Reply, each communication apparatus checks whether or not power consumption of the flow does not exceed usable power. Further, when it is OK (that is, when power consumption of the flow does not exceed the usable power), each communication apparatus transfers Route Request and Reply.

Example 2

In the present example, an operation in case that a single path cannot accommodate a flow will be described. More specifically, in the present example, an operation in case that the path control unit 302 accommodates a flow also using another path when power consumption exceeds electric energy which can be used in a searched path will be described. In the present example, a case will be described as an example where a communication network illustrated in FIG. 1 is controlled.

The path control apparatus 201 accepts a path setting request of a flow which uses 30 Mbps in the period from the time t to t'=t+2 between the communication apparatus 202 and the communication apparatus 204 at the time t. In this case, the path control unit 302 of the path control apparatus 201 calculates power which can be used during a continuation time of the flow of each communication apparatus. The power which each communication apparatus can use is the same as the power calculated according to above equation 13.

Next, the path control unit 302 checks a path from the communication apparatus 202 to the communication apparatus 204. When current power consumption of the communication apparatus 204 is $P_{204}$ and an increase of power consumption of the radio link 294 when a flow is added thereto is $D_{294}$, the path control unit 302 checks whether or not an inequality indicated in following equation 16 holds.

$$(P_{204}+D_{294})*(t'-t)<=A_{204}*F(t,t') \quad \text{(Equation 16)}$$

In this case, to accommodate a flow, the radio link 294 changes a modulation scheme from QPSK to 16 QAM. Hence, power consumption is increased by 2 W. That is, $D_{294}=2$ holds. Hence, $P_{204}=30$ holds, and an inequality indicates the following relationship.

$$P_{204}+D_{294}=(30+2)*2>62$$

Therefore, when the path "communication apparatus 202-communication apparatus 204" is used, the power consumption exceeds the usable power. Hence, using only this path is not possible.

Similarly, when the path "communication apparatus 202-communication apparatus 203-communication apparatus 205" is used, the radio link 295 in the path "communication apparatus 203-communication apparatus 204" changes a modulation scheme from QPSK to 16 QAM. Hence, power consumption is increased by 2 W. That is, $D_{295}=2$ holds. Hence, $P_{204}=30$ holds, and an inequality indicates the following relationship.

$$P_{204}+D_{295}=(30+2)*2>62$$

Therefore, when the path "communication apparatus 202-communication apparatus 203-communication apparatus 205" is used, power consumption also exceeds usable power. Hence, using only this path is not possible.

In such a case, the path control unit 302 divides a flow into multiple paths, and checks whether or not the multiple paths can accommodate flows. More specifically, the path control unit 302 searches a path which can accommodate a flow with the least increase in power consumption of each link. That is, the path control unit 302 calculates an empty band in which a power consumption increase of a link on a path is minimum.

When, for example, a flow a path setting of which is requested is accommodated, the path control unit 302 sets as cost an increase of power consumption occurring in each link, and adopts a path the total cost of which is the least. In this case, a link which does not have an empty band which can accommodate a flow or a link power consumption of which exceeds electric energy which can be used allocated to a relay station due to an increase of power consumption upon accommodation of a flow may be removed in advance.

The path control unit 302 may search a path link cost of which is minimum using, for example, a Dijkstra method. Meanwhile, a method of searching a path is not limited to the above method. Additionally, the path control unit 302 may list up all candidate paths and adopt a path a total value of link cost of which is the least among the paths.

In the example illustrated in FIG. 1, there is a margin for accommodating a flow corresponding to 10 Mbps without increasing power consumption of the link in the path "communication apparatus 202-communication apparatus 204". Hence, the path control unit 302 sets 10 Mbps among 30 Mbps to the path "communication apparatus 202-communication apparatus 204". That is, the path control unit 302 divides a band of a flow based on the calculated empty band. When the flow corresponding to 10 Mbps is set to the path "communication apparatus 202-communication apparatus 204", a relationship between power consumption and usable power of the communication apparatus 202 and the communication apparatus 204 satisfies the following relationship.

$$P_{202}+D_{294}=(20+0)*2<60$$

$$P_{204}+D_{294}=(30+0)*2<62$$

Consequently, it is possible to accommodate the flow in the range of usable power. For a flow corresponding to the rest of 20 Mbps, the path "communication apparatus 202-communication apparatus 203-communication apparatus 204" is used. The path control unit 302 checks power consumption of each communication apparatus. In this case, the path control unit 302 checks power consumption of the communication apparatus 202 and the communication apparatus 204 assuming that the flow corresponding to 10 Mbps flows to the calculated path "communication apparatus 202-communication apparatus 204". In this case, the relationship between the power consumption and the usable power satisfies the following relationship.

$$P_{202}+D_{294}+D_{296}=(20+0+0)*2<60$$

$$P_{203}+D_{296}+D_{295}=(30+0+0)*2<145$$

$$P_{204}+D_{294}+D_{295}=(30+0+0)*2<62$$

Consequently, the power consumption of all of the communication apparatus 202, the communication apparatus 203 and the communication apparatus 204 goes below the usable power. Consequently, it is possible to accommodate a flow in a range of usable power and use the path.

As described above, by setting multiple paths of the path "communication apparatus 202-communication apparatus 204" and the path "communication apparatus 202-communication apparatus 203-communication apparatus 204", it is possible to accommodate the flow. Hence, the path control unit 302 sets these multiple paths as paths.

Thus, when power consumption exceeds electric energy which can be used in at least two or more searched paths, the path control unit 302 calculates an empty band in which a power consumption increase of a link on a path is minimum. Then, the path control unit 302 divides a band of a flow based on the calculated empty band, and searches a path based on the divided flows. Consequently, it is possible to further satisfy a path setting request in addition to the effect of the first example.

Next, a minimum configuration example of the present invention will be described. FIG. 9 depicts a block diagram illustrating an example of a minimum configuration of a path control apparatus according to the present invention. A path control apparatus (for example, the path control apparatus 201) according to the present invention has: a total electric energy calculating means 81 (for example, the path control unit 302) which calculates total electric energy (for example, the total electric energy A) which can be used by each communication apparatus (for example, the communication apparatuses 202 to 205) in a predetermined period (for example, daily units); a usable power calculating means 82 (for example, the path control unit 302) which, based on a distribution function (for example, the distribution function F(t, t')) which is a function which defines a rate of power which can be used in an arbitrary time zone (for example, from the time t to t') in the period, and the total electric energy, calculates electric energy which can be used by each communication apparatus in a specified time zone; and a usable electric energy determining means 83 (for example, the path control unit 302) which, when specifying a time zone in which traffic is accommodated and making a path setting request (for example, an admission request), determines per communication apparatus on a communication path whether or not power consumption (for example, power consumption of a communication apparatus and increased power consumption of a link) which is necessary to accommodate the traffic in the time zone exceeds the electric energy which can be used.

According to this configuration, it is possible to, even when there is a communication apparatus, electric energy which can be used of the communication apparatus fluctuates on a communication network, continue stably accommodating traffic.

For example, a link band is mainly taken into account according to a common path control method, and therefore path control cannot be performed taking into account usable power of a communication apparatus. However, according to the present exemplary embodiment, based on the electric energy which can be used calculated by the usable power calculating means 82, the usable electric energy determining means 83 determines whether or not power consumption of the communication apparatus exceeds the electric energy which can be used. Consequently, it is possible to perform path control taking into account usable power of a communication apparatus. In other words, by restricting electric energy which can be used by each communication apparatus, an influence of a difference in a power generation amount on a traffic accommodation amount is reduced. Consequently, it is possible to stably accommodate traffic.

Further, the usable electric energy determining means 83 may search a path which is routed through a communication apparatus power consumption of which does not exceed electric energy which can be used based on a determination result of electric energy which can be used.

That is, in the present exemplary embodiment, to maintain an admission rate (accommodation rate) with respect to a traffic demand in each time zone, the electric energy which can be used in each time zone is restricted using a ratio of a traffic volume (that is, the distribution function F) in a time zone of the entire time zone. Further, the usable electric energy determining means 83 searches a path which can maintain QoS (Quality of Service) of traffic while satisfying this restriction. Consequently, it is possible to stably continue accommodating traffic.

Further, the usable power calculating means 82 may calculate the electric energy which can be used by each communication apparatus based on a distribution function (for example, equation 7) defined based on a traffic profile (for example, traffic profile information tr(t)).

Furthermore, using a power generation amount which is expected upon a sunny day or an average power generation amount based on statistical information (for example, $E^{sun}$) as a reference, the total electric energy calculating means 81 may calculate total electric energy based on the rate of a remaining battery with respect to maximum battery capacity (for example, $B(Ns)/B^{MAX}$) and a rate of a predicted power generation amount based on weather prediction in a predetermined period with respect to the power generation amount upon a sunny day in the predetermined period (for example, $W/(3*E^s_n)$) (for example, using equation 10).

Still further, when power consumption of at least two or more searched paths exceeds the electric energy which can be used, the usable electric energy determining means 83 may calculate an empty band in which a power consumption increase of a link on the path becomes minimum, divide a band of a flow based on the calculated empty band and search a path which is routed through a communication apparatus in which power consumption of the flow of the divided band does not exceed the electric energy which can be used.

FIG. 10 depicts a block diagram illustrating an example of a minimum configuration of a network control system according to the present invention. The network control system illustrated in FIG. 10 has a communication apparatus 90 (for example, the communication apparatuses 202 to 205), and at least one or more path control apparatus 80 (for example, the path control apparatus 201) which controls a communication path of the communication apparatus. In addition, content of the path control apparatus 80 is the same as the content of the path control apparatus illustrated in FIG. 9, and therefore will not be described.

According to this configuration, it is possible to, even when there is a communication apparatus, electric energy which can be used of the communication apparatus fluctuates on a communication network, continue stably accommodating traffic.

Although the present invention has been described above with reference to the exemplary embodiment and examples, the present invention is by no means limited to the above exemplary embodiment and examples. The configurations and the details of the present invention can be variously changed within a scope of the present invention which one of ordinary skill in art can understand.

This application claims priority to Japanese Patent Application No. 2011-108090 filed on May 13, 2011, the entire contents of which are incorporated by reference herein.

INDUSTRIAL APPLICABILITY

The present invention is suitably applied to a network control system which sets a communication path of a flow and controls a network. For example, the present invention can be used for mobile backhaul in a mobile telephone network.

REFERENCE SIGNS LIST

201 Path control apparatus
202 to 205 Communication apparatus
291 Fixed line
292 to 296 Radio link
301 Communication unit
302 Path control unit
303 Topology information managing unit
304 Traffic information managing unit
305 Communication apparatus information managing unit
401 Communication unit
402 Traffic control unit
403 Flow managing unit
404 Power source managing unit

What is claimed is:
1. A telecommunication network control method, comprising:
   calculating a total electric energy available for use by each communication apparatus of one or more communication apparatuses in a period, wherein the one or more communication apparatuses each comprises a network node in the telecommunication network;
   calculating electric energy available for use by each communication apparatus of the one or more communication apparatuses in a specified time zone based on the calculated total electric energy and on a distribution function that defines an amount of electric energy of the total electric energy available for use in one or more time zones in the period;
   determining, for each of the one or more communication apparatuses located on a communication path, based on a request to accommodate traffic in the specified time zone, whether an expected power consumption to accommodate the traffic in the specified time zone exceeds the electric energy available for use in the specified time zone; and
   searching for communication paths through a subset of the one or more communication apparatuses;
   determining whether an expected power consumption of each apparatus in the subset to accommodate the traffic exceeds the calculated total electric energy;
   based on a determination that the expected power consumption for each apparatus in the subset to accommodate the traffic exceeds the calculated total electric energy, calculating an empty communication band for which an expected power consumption increase of a link along a path is less than expected power consumption increases for other links; and dividing a communication band of the paths based on the calculated empty band.

2. The telecommunication network control method according to claim 1, further comprising, based on the calculated total electric energy, identifying a path through a subset of the one or more communication apparatuses for which the expected power consumption does not exceed the calculated total electric energy.

3. The telecommunication network control method according to claim 1, wherein the distribution function is based on a traffic profile.

4. The telecommunication network control method according to claim 3, further comprising determining the traffic profile based on calculating a ratio of a rate of traffic volume of the one or more communication apparatuses in the specified time zone to a rate of traffic volume of the one or more communication apparatus in the one or more time zones during the period.

5. The telecommunication network control method according to claim 1, further comprising, calculating the total electric energy based on an amount of power expected to be generated by a solar power source during on a sunny day period.

6. The telecommunication network control method according to claim 1, further comprising calculating the total electric energy based on statistical information indicating an average power generation amount generated by each of the communication apparatuses in past operation.

7. The telecommunication network control method according to claim 1, further comprising calculating the total electric energy based on an amount of power remaining in a battery associated with each of the communication apparatuses.

8. The telecommunication network control method according to claim 1, further comprising calculating the total electric energy based on a predicted amount of power generation by a solar power source, wherein the predicted amount of power generation is predicted based on a weather prediction for the period.

9. A non-transitory computer-readable medium storing instructions executable by at least one processor to control a telecommunication network according to a method, the method comprising:
  calculating a total electric energy available for use by each communication apparatus of one or more communication apparatuses in a period, wherein the one or more communication apparatuses each comprises a network node in the telecommunication network;
  calculating electric energy available for use by each communication apparatus of the one or more communication apparatuses in a specified time zone based on the calculated total electric energy and on a distribution function that defines an amount of electric energy of the total electric energy available for use in one or more time zones in the period;
  determining, for each of the one or more communication apparatuses located on a communication path, based on a request to accommodate traffic in the specified time zone whether an expected power consumption to accommodate the traffic in the specified time zone exceeds the electric energy available for use in the specified time zone; and
  searching for communication paths through a subset of the one or more communication apparatuses;
  determining whether an expected power consumption of each apparatus in the subset to accommodate the traffic exceeds the calculated total electric energy;

based on a determination that the expected power consumption for each apparatus in the subset to accommodate the traffic exceeds the calculated total electric energy, calculating an empty communication band for which an expected power consumption increase of a link along a path is less than expected power consumption increases for other links; and
  dividing a communication band of the paths based on the calculated empty band.

10. The non-transitory computer-readable medium according to claim 9, wherein the method further comprises searching for a path through one or more of the communication apparatuses for which power consumption does not exceed the calculated electric energy available for use in the specified time zone by each of the communication apparatuses in the path.

11. The non-transitory computer-readable medium according to claim 9, wherein the distribution function is based on a traffic profile.

12. The path control apparatus according to claim 11, wherein the processor is configured to determine the traffic profile by calculating a ratio of a rate of traffic volume of the one or more communication apparatuses in the specified time zone to a rate of traffic volume of the one or more communication apparatus in the one or more time zones during the period.

13. The non-transitory computer-readable medium according to claim 9, wherein the method further comprises calculating the total electric energy based on an amount of power remaining in a battery associated with each of the communication apparatuses.

14. The non-transitory computer-readable medium according to claim 9, wherein the method further comprises calculating the total electric energy based on a predicted amount of power generation by a solar power source, wherein the predicted amount of power generation is predicted based on a weather prediction for the period.

15. A telecommunication network control apparatus for controlling one or more communication apparatus, each comprising a network node in a telecommunication network, the apparatus comprising:
  at least one memory device storing computer-executable instructions; and
  a path control processor configured to execute the stored instructions to:
  calculate a total electric energy available for use by each communication apparatus of the one or more communication apparatuses in a period;
  calculate electric energy available for use by each communication apparatus of the one or more communication apparatuses in a specified time zone based on the calculated total electric energy available and on a distribution function that defines an amount of electric energy of the total electric energy available for use in one or more time zones in the period;
  determine, for each of the one or more communication apparatuses located on a communication path, based on a request to accommodate traffic in the specified time zone, whether an expected power consumption to accommodate the traffic in the specified time zone exceeds the electric energy available for use in the specified time zone; and
  search for communication paths through a subset of the one or more communication apparatuses;
  determine whether an expected power consumption of each apparatus in the subset to accommodate the traffic exceeds the calculated total electric energy;

based on a determination that the expected power consumption for each apparatus in the subset to accommodate the traffic exceeds the calculated total electric energy, calculate an empty communication band for which an expected power consumption increase of a link along a path is less than expected power consumption increases for other links; and divide a communication band of the paths based on the calculated empty band.

16. The telecommunication network control system according to claim 15, wherein the distribution function is based on a traffic profile.

17. The telecommunication network control system according to claim 16, wherein the processor is configured to determine the traffic profile by calculating a ratio of a rate of traffic volume of the one or more communication apparatuses in the specified time zone to a rate of traffic volume of the one or more communication apparatus in the one or more time zones during the period.

18. The telecommunication network control system according to claim 16, wherein the processor is configured to calculate the total electric energy based on an amount of power remaining in a battery associated with each of the communication apparatuses.

19. The telecommunication network control system according to claim 16, wherein the processor is configured to calculate the total electric energy based on a predicted amount of power generation by a solar power source, wherein the predicted amount of power generation is predicted based on a weather prediction for the period.

* * * * *